United States Patent [19]

Pringle

[11] Patent Number: 4,538,838

[45] Date of Patent: Sep. 3, 1985

[54] METHOD AND APPARATUS OF SEALING THREADED SECTIONS OF A WELL TOOL

[75] Inventor: Ronald E. Pringle, Houston, Tex.

[73] Assignee: Camco, Incorporated, Houston, Tex.

[21] Appl. No.: 450,943

[22] Filed: Dec. 20, 1982

Related U.S. Application Data

[63] Continuation-in-part of Ser. No. 440,667, Nov. 10, 1982, Pat. No. 4,460,046.

[51] Int. Cl.³ ............................................. F16L 37/00
[52] U.S. Cl. ...................................... 285/91; 285/92; 285/403; 403/320; 411/200
[58] Field of Search ................... 285/91, 92, 403, 404; 403/320; 411/197, 198, 199, 200, 201

[56] References Cited

U.S. PATENT DOCUMENTS

| | | | |
|---|---|---|---|
| 986,837 | 3/1911 | Light | 411/201 X |
| 1,958,817 | 5/1934 | Gase | 285/91 X |
| 2,409,969 | 10/1946 | Williams | 411/200 |
| 3,608,933 | 9/1971 | Lee | 403/320 X |
| 3,702,707 | 11/1972 | Rosan | 285/92 X |
| 3,923,324 | 12/1975 | Cruickshank et al. | 285/332.3 X |
| 4,253,687 | 3/1981 | Maples | 285/332.3 |
| 4,406,485 | 9/1983 | Giebeler | 285/92 X |

Primary Examiner—Dennis L. Taylor
Attorney, Agent, or Firm—Fulbright & Jaworski

[57] ABSTRACT

A method and apparatus of making up and sealing between threaded sections of a well tool such as a safety valve. The female connection includes an end on one side of its thread and a shoulder on the other side of its thread and the male connection includes an end on one side of its thread and a shoulder on the other side of its thread. A soft metal seal is positioned between the end of the male connection and the shoulder on the female connection for sealing between the connections when the connections are threaded together. A hole is drilled in the made-up connection through the shoulder of the male connection and the end of the female connection and a plug is positioned in the hole with a force fit for maintaining the rotational and longitudinal alignment of the made-up connection. Preferably the metal seal is supported by a recess on one of the connections and a taper on the other of the connections. The plug may include a connection for removing the plug. Preferably the hole and plug are round and a plurality of holes and plugs may be provided.

10 Claims, 5 Drawing Figures

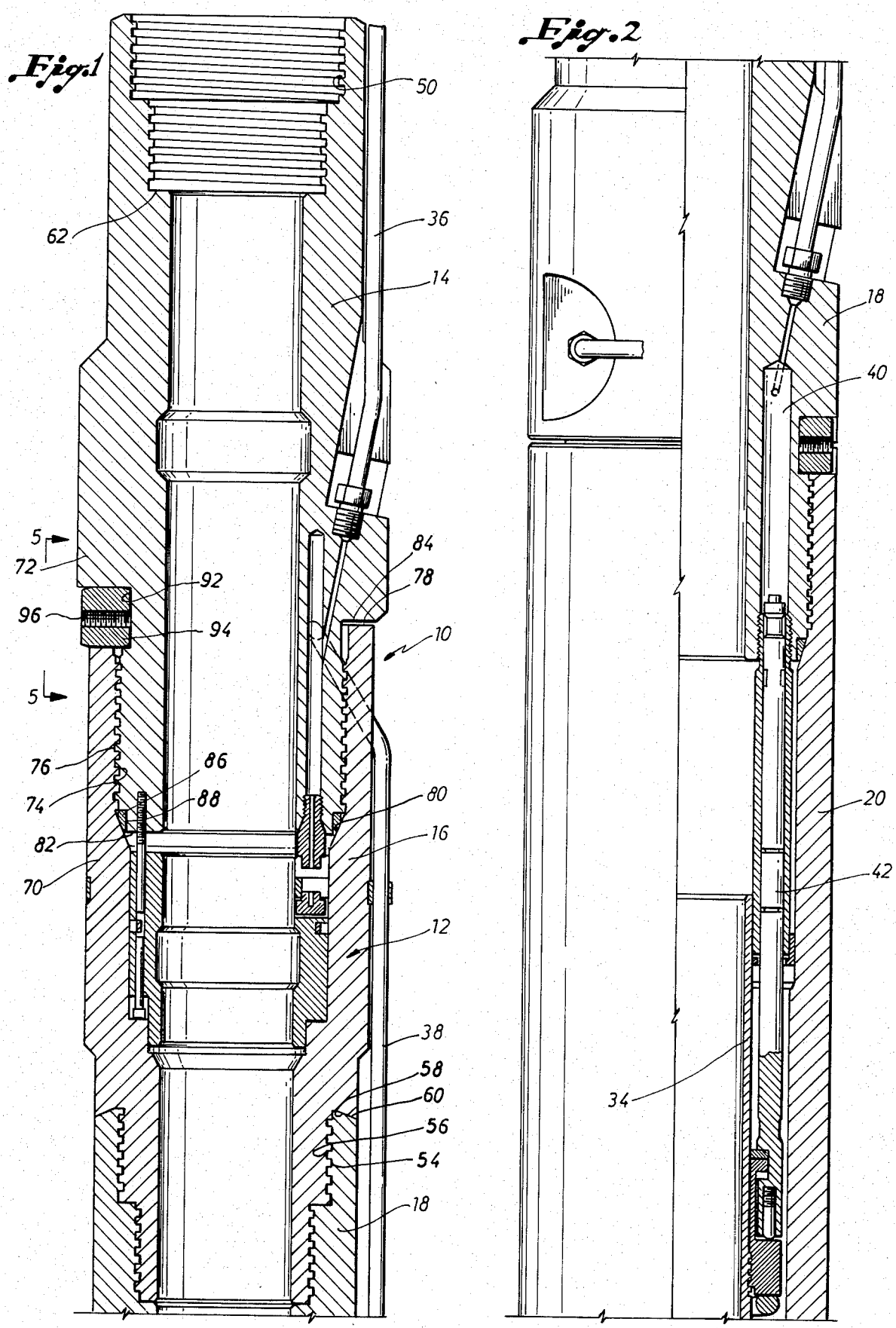

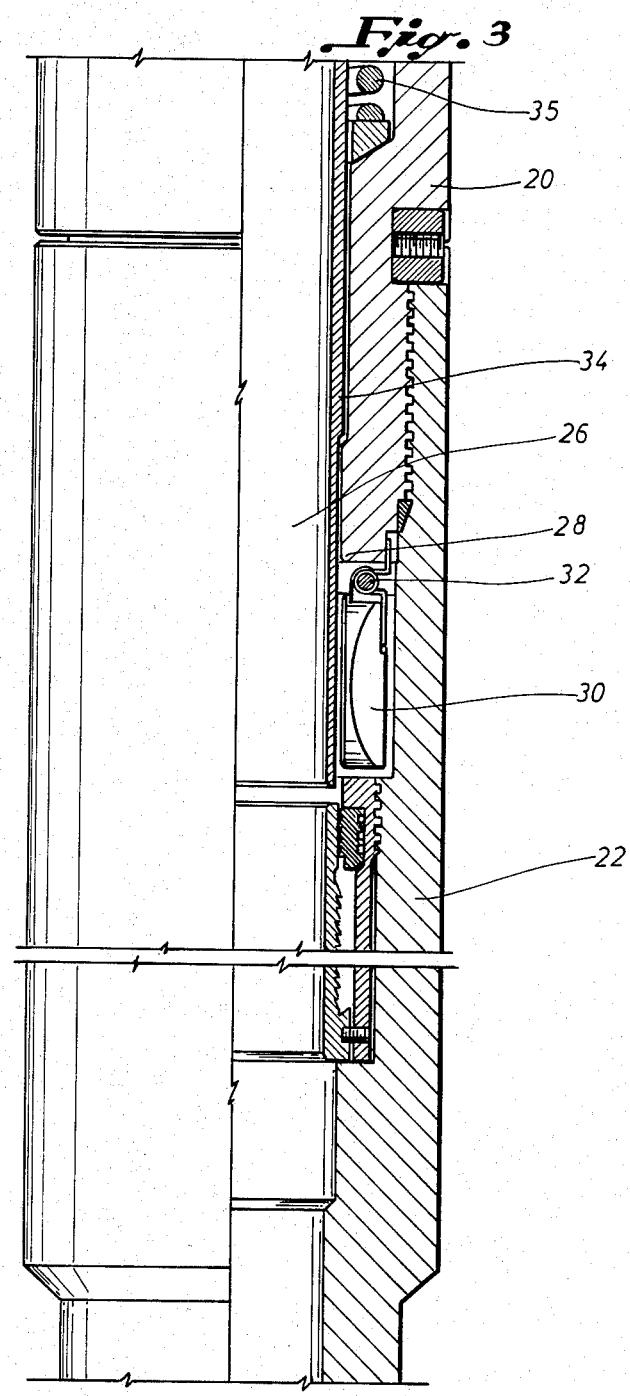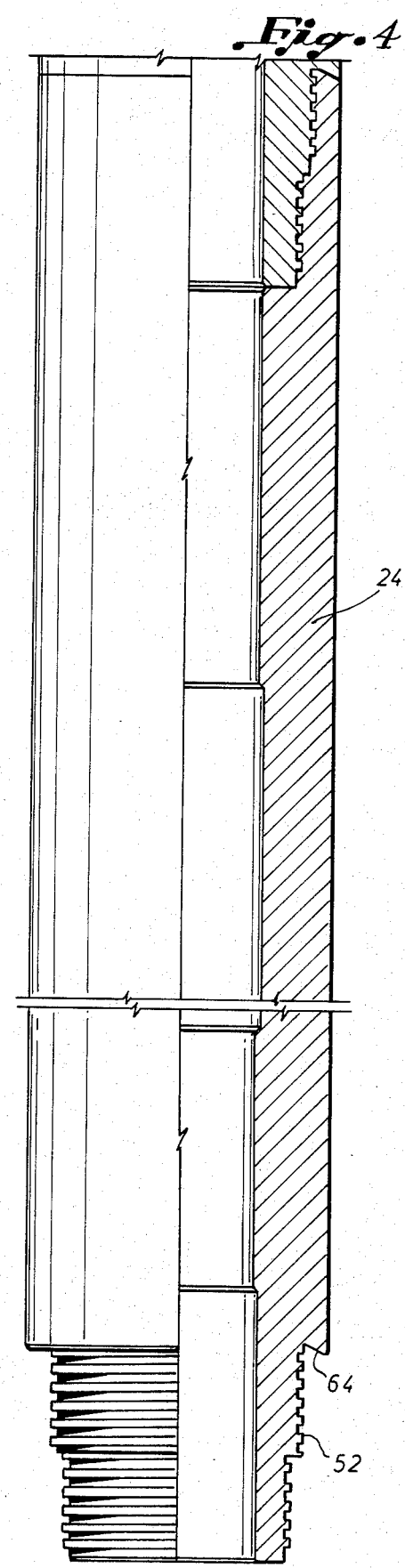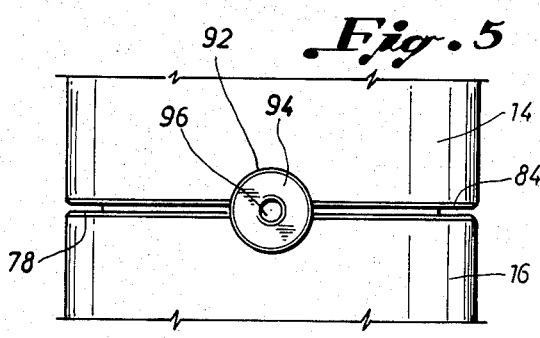

METHOD AND APPARATUS OF SEALING THREADED SECTIONS OF A WELL TOOL

CROSS-REFERENCE TO RELATED APPLICATION

This application is a continuation in part of copending patent application Ser. No. 440,667, filed Nov. 10, 1982, now U.S. Pat. No. 4,460,046.

BACKGROUND OF THE INVENTION

Various types of oil and/or gas well tools are used in which the body includes a plurality of metal sections threadably connected together to enclose the working parts of the tools. The threaded connections of the sections must be pressure tight. In the past the threaded connections included an integral metal seal for sealing the threaded connections. However, in assembling the well tool, various adjustments have to be made in the internal workings of the tool. This requires that the threaded sections of the well tool be repeatably unscrewed and rescrewed together until the working parts are suitably adjusted. However, metal threaded connections with integral seals have a propensity for galling, particularly when the metal is a corrosion-resistant alloy. And when the metal parts gall, they become defective and must be replaced which is expensive and time-consuming. While elastomer seals are satisfactory for initially holding a pressure seal, they have a short life in the harsh environment of temperatures and corrosive fluids encountered in a well.

The present invention is directed to a method and apparatus for making up and sealing threaded sections of a well tool with a metal seal for holding pressure in which the seals may be made up and broken out a multiple of times and in which the seal is held in a secure seal position after final makeup.

SUMMARY

The present invention is directed to a pressured seal joint between a male and female threaded connection of a well tool including a soft metal seal positioned between the male and female connections sealing between the connections when the connections are threaded together. A hole is drilled in the exterior of the made-up connection into the outer portions of each of the connections. A plug is positioned in the hole with a force fit for maintaining the rotational and longitudinal alignment of the made-up connection. Preferably, the metal seal is supported by a recess in one of the connections and a taper on the other of the connections. The plug may include a connection for removing the plug. In addition, a plurality of holes and plugs may be positioned between the connections. The present invention is particularly useful wherein the male and female threaded connections are super alloy metals having a tendency to gall.

A still further object of the present invention is the provision of a pressure seal joint between a male and female threaded connection of a well tool such as a safety joint. The female connection includes an end on one side of its thread and a shoulder on the other side of its thread. The male connection includes an end on one side of its thread and a shoulder on the other side of its thread. A soft metal seal is positioned between the end of the male connection and the shoulder on the female connection for sealing between the connections when the connections are threaded together. After makeup, a hole is drilled in the exterior of the made up connection through the shoulder of the male connection and the end of the female connection and a plug is positioned in the hole with a force fit for maintaining the rotational and longitudinal alignment of the made-up connection. Preferably, the hole and plug are round.

Yet a still further object of the present invention is the provision of a method sealing a joint between a male and female threaded connection of a well tool by threadably connecting the male and female connections with a soft metal seal positioned between the end of the male connection and the shoulder on the female connection with a predetermined torque for sealing between the connections. After the connection is made up, the seal connection is pressure tested and thereafter a hole is drilled in the exterior of the made-up connection through the shoulder of the male connection and the end of the female connection and a plug is inserted into the drilled hole with a force fit for maintaining the rotational and longitudinal alignment of the made-up connection.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIGS. 1, 2, 3 and 4 are elevational views, partly in cross section, of a well safety valve utilizing the present invention and are continuations of each other, and FIG. 5 is a cross-sectional view taken along the line 5—5 of FIG. 1.

DESCRIPTION OF THE PREFERRED EMBODIMENT

While the present invention will be described, for purposes of illustration only, as incorporated in a well safety valve, it will be understood that the present invention may be used with other types of well tools having threaded sections.

Referring now to the drawings, the reference numeral 10 generally indicates a piston actuated well safety valve having a body or housing 12 which includes a plurality of threadably connected sections 14, 16, 18, 20, 22, and 24.

The valve 10 includes a bore 26, an annular valve seat 28 positioned about the bore 26, and a valve closure element 30 connected to the body 12 by a pivot pin 32. A flow tube 34 is telescopically movable in the body 12 and through the valve seat 28. When the flow tube 34 is moved to a downward position, the tube 34 pushes the valve element 30 away from the seat and opens the valve. When the flow tube 34 is moved upwardly, the valve element 30 is allowed to seat on the seat 28 and close the well bore 26. The flow tube 34 is biased upwardly by various forces such as a spring 35 and the valve is closed by the removal of hydraulic fluid through a control line 36 extending to the well surface which supplies fluid through a flow control line 38 to a chamber 40 and against one or more pistons 42 movable in the chamber 40. The pistons 42 in turn acts against the flow tube 34. When sufficient hydraulic fluid pressure is applied to the flow control line 36, the flow tube 34 is moved downwardly to open the valve. If the fluid pressure in the flow control line 36 is reduced sufficiently, the flow tube 34 will be moved upwardly beyond the seat 28 to allow the valve element 30 to close on the seat 28. The above described well safety valve is generally disclosed in copending patent application Ser. No. 440,667, filed Nov. 10, 1982, now U.S. Pat. No. 4,460,046.

The safety valve 10 includes a threaded connection 50 at the top and a threaded connection 52 at the bottom for connecting the safety valve 10 into a tubing string. In addition, as noticed, the various sections 14, 16, 18, 20, 22 and 24 are joined together by threaded connections. Normally, the thread connection, such as 16 and 18, are joined together with conventional coacting threads 54 and 56, here shown as two-step Hydril threads. The threaded connections 54 and 56 also include coacting metal seals such as 58 on section 16 and 60 on section 18. Similarly, the connecting threads 50 include metal seal surface 62 and the threads 52 include a metal seal surface 64. Similarly, other types of threaded connections having integral metal seals are conventionally used. The conventional integral metal seals are normally satisfactory in making up threaded connections which are not required to be threaded and unthreaded a multiple number of times. That is, conventional threaded connections having integral metal seals such as 58 and 60, 62 and 64 require a high torque in order to satisfactorily seal the integral metal seals. And if the integral metal seals are subjected to repeated threading and unthreading they have a tendency to gall. This is particularly true of the various corrosion resistant alloy metals being used in well bores today. When the threaded connections become galled they are defective and much be replaced which is expensive and time-consuming.

Generally, the conventional threads 50 and 52 are satisfactory since they are merely used to connect the safety valve 10 into a tubing string and need not be unthreaded and threaded. However, other types of threaded connections in the safety valve 10, such as the threaded connection between sections 14 and 16, between 18 and 20, between 20 and 22 and between 22 and 24 are frequently threaded and unthreaded a multiplicity of times in assembling the safety valve 10. That is, in assembling the various internal parts of the valve 10, the various parts must frequently be exposed and adjusted before the working parts are finally adjusted. This requires that various sections of the tool 10 be threaded and unthreaded which increases the possibility that the sections having integral seals may gall.

The present invention is directed to a method and apparatus for making up and sealing threaded sections of a well tool with a metal seal which will hold the desired pressure and in which the connections may be made up and broken out a multiple of times without the danger of galling and consequent loss of the parts due to becoming defective.

Referring now to FIG. 1, a threaded connection is shown between a female connection 70 and a male connection 72 having coacting threads 74 and 76, respectively. The female connection includes an end 78 on one side of its thread 74 and a shoulder 80 on the other side of its thread 74. The male connection 72 includes an end 82 on one side of its thread 76 and a shoulder 84 on the other side of its thread. A soft metal seal 86 such as monel or inconel is positioned between the end 82 of the male connection 72 and the shoulder 80 on the female connection 70 for sealing between the connections 70 and 72 when the threads 74 are threaded together. The seal 86 has the advantage of being deformable and providing a metal-to-metal seal which will withstand the required pressures, which is not subject to the galling problems of integral seals, and which does not require a makeup torque as high as integral seals to withstand the same pressure.

Preferably the metal seal 86 is supported in a recess in one of the connections, such as a recess 88, at the end 82 of the male connection 72, and a taper in the other connection such as a taper on the female shoulder 80. Additionally, the threaded connections 74 and 76 may be repeatedly broken out and remade in order to adjust the working parts of the tool. If for some reason after pressure testing the made up joint the metal seal 86 is found to be defective or has become defective because of multiple makeups, it can be easily and cheaply replaced as compared to replacing the parts 14 and 16.

After the tool 10 is completed, adjusted and finally assembled, it is pressure tested by plugging one of the ends and applying pressure at the other end to insure that the threaded connections hold the desired pressure. After the tool 10 has passed its final inspection, a hole 92 is drilled in the exterior of the made-up connection through the male shoulder 84 and through the end 78 of the female connection 70 and a plug 94 is positioned in the hole 92 with a force fit. The plug 94 maintains both a rotational and a longitudinal alignment between the made-up connection between the threaded member 70 and 72. It is important to maintain the rotational alignment of the made-up connection in order to prevent any unscrewing of the threaded connections 74 and 76 which would relax the metal seal 86 and allow the connection to leak. In addition, it is also important to maintain longitudinal alignment of the made-up connection. That is, in an oil well tubing into which the tool 10 may be inserted, the tubing may be subjected to various tension and compression loads. While the threads 74 and 76 mate rather closely, there is still some degree of tolerances involved and if the members 70 and 72 are longitudinally moved relative to each other the seal 86 may be subjected to compression forces, which, while increasing the seal, may deform the seal 86. If the seal 86 were deformed on a compression load and then the load was relieved, the seal 86 could possibly retain its "set" and fail to hold the required pressures.

If desired, a plurality of holes 92 and plugs 94 may be provided at each threaded connection. And while the plugs 94 generally provide a permanent interconnection between the threaded sections, a threaded connection 96 may be provided therein for more easily pulling the plugs 94 in the future if required.

The method of the present invention is apparent from the foregoing description of the apparatus and comprehends sealing a joint between a male and female threaded connection of a well tool against pressure in which the female connection includes an end on one side of its thread and a shoulder on the other side of its thread, and the male connection includes an end on one side of its thread and a shoulder on the other side of its thread. The method comprehends threadably connecting said male and female connections with a soft metal seal positioned between the end of the male connection and the shoulder of the female connection with a predetermined torque for sealing the connection. After pressure testing the seal connections, the method comprehends drilling a hole in the exterior of the made-up connection through the shoulder of the male connection and the end of the female connection and inserting a plug into the drilled hole with a force fit for maintaining the rotational and longitudinal alignment of the made-up connection.

The present invention, therefore, is well adapted to carry out the objects and attain the ends and advantages mentioned as well as others inherent therein. While a presently preferred embodiment has been given for the purpose of disclosure, numerous changes in the details of construction and arrangement of parts and steps of the process will be readily apparent to those skilled in the art and which are encompassed within the spirit of the invention and the scope of the appended claims.

What is claimed is:

1. A pressure sealed joint between a male and female threaded connection of a well tool comprising,
    said female connection including an end on one side of its thread and a shoulder on the other side of its thread,
    the male connection including an end on one side of its thread and a shoulder on the other side of its thread,
    a soft metal seal positioned between the end of the male connection and the shoulder on the female connection for sealing between the connections when the connections are threaded together,
    a non-circumferentially extending hole drilled in the exterior of the made-up connection through the shoulder of the male connection and the end of the female connection, and
    a plug positioned in the hole with a force fit for maintaining the rotational and longitudinal alignment of the made-up connection.

2. The apparatus of claim 1 wherein the metal seal is supported by a recess in one of the connections and a taper on the other of the connections.

3. The apparatus of claim 1 wherein the plug includes a connection for removing the plug.

4. The apparatus of claim 1 including a plurality of holes and plugs positioned between the connections.

5. The apparatus of claim 1 wherein the male and female connections are superalloy metals having a tendency to gall.

6. The apparatus of claim 3 wherein said hole and plug are round.

7. The apparatus of claim 1 wherein the well tool is a safety valve.

8. A method of sealing a joint between a male and female threaded connection of a well tool against pressure in which the female connection includes an end on one side of its thread and a shoulder on the other side of its thread, and the male connection includes an end on one side of its thread and a shoulder on the other side of its thread comprising,
    threadably connecting said male and female connections with a soft metal seal positioned between the end of the male connection and the shoulder on the female connection with a predetermined torque for sealing between the connection,
    drilling a hole in the exterior of the made-up connection in only a part of the circumference of the connection through the shoulder of the male connection and the end of the female connection after sealing between the connection, and
    inserting a plug into the drilled hole with a force fit for maintaining the rotational and longitudinal alignment of the made-up connection.

9. The method of claim 8 including,
    pressure testing the sealed connection before drilling the hole.

10. The method of claim 9 wherein the hole and plug are round.

* * * * *